Patented Aug. 18, 1942

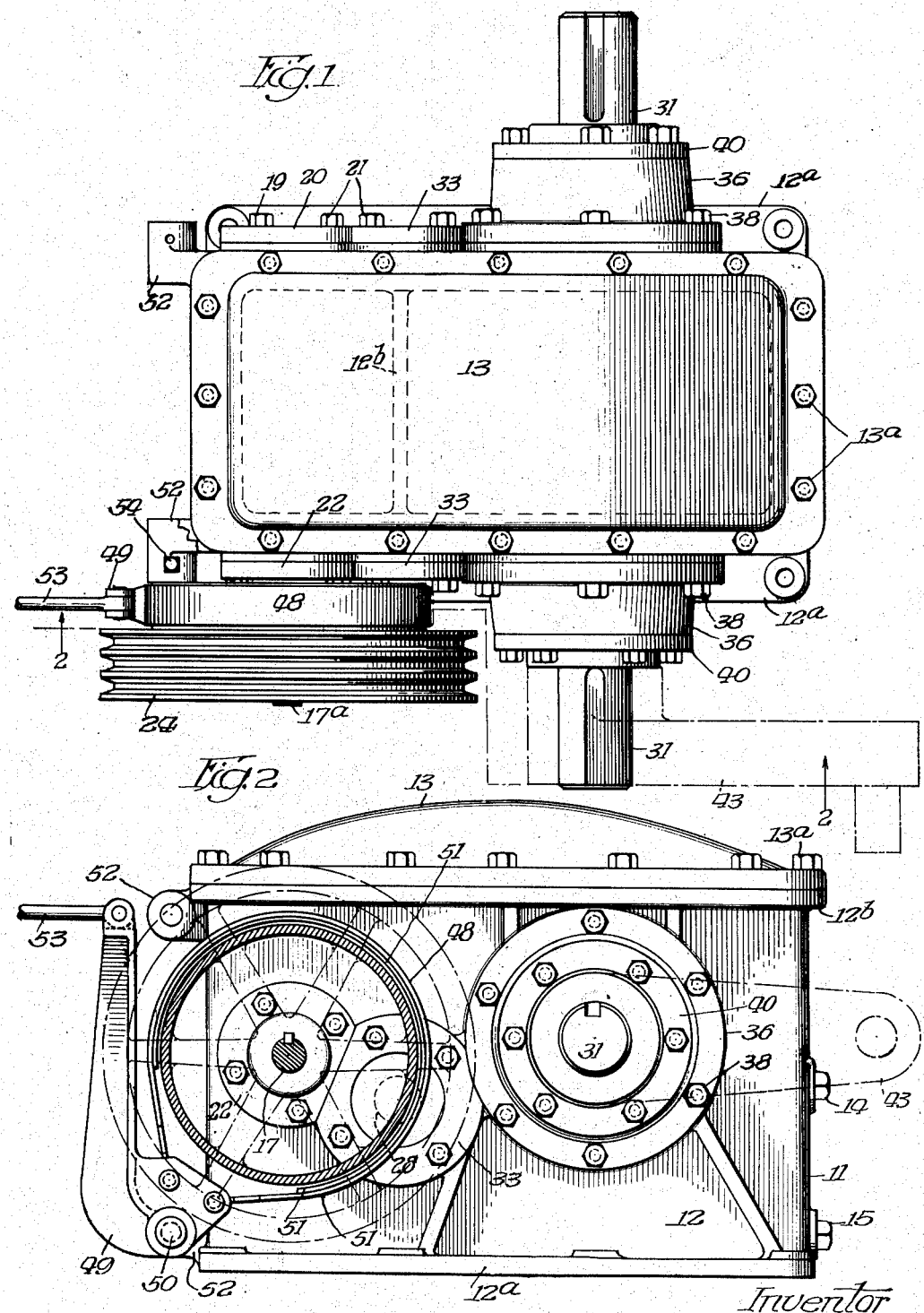

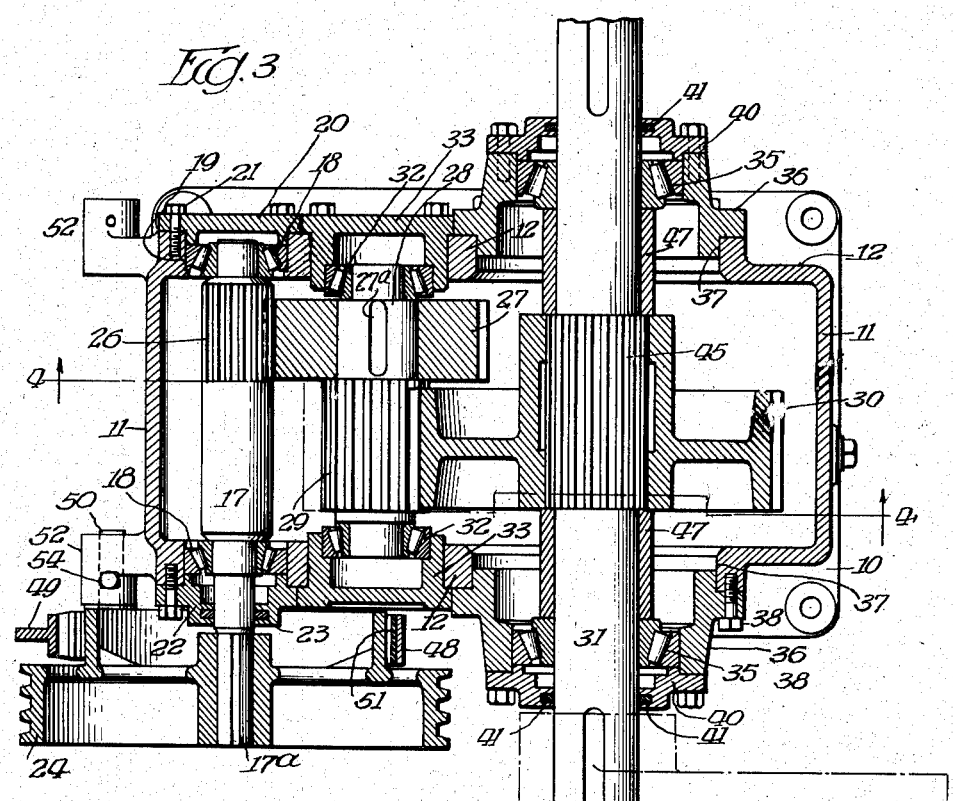

2,293,200

UNITED STATES PATENT OFFICE 2,293,200

SPEED REDUCER

Bradford Foote, River Forest, Ill.

Application January 15, 1940, Serial No. 313,847

4 Claims. (Cl. 74—395)

The invention relates to speed-reducers.

One object of the invention is to provide a speed-reducing unit of the type for oil-field work, which includes a driving or power in-put shaft, a driven or out-put shaft, and an intermediate shaft, which are journaled in a case having integral walls, as contra-distinguished from a split casing between the sections of which the shafts are mounted, the shaft being endwise insertable in the casing and through gears in the casing.

Another object of the invention is to provide a multiple spline driving-connection between a gear and the out-put shaft which is used to operate a crank used for shifting a beam and is subjected to uneven or pounding loads during each revolution, which connection permits periodical rotative adjustment between the shaft and the gear so that the pounding moments transmitted through the out-put shaft to the speed reduction gearing will be imposed on different groups of gear-teeth of the gear on said shaft to prevent localized wear of one group of those teeth which are engaged during the pounding moments.

Another object of the invention is to simplify the construction of speed-reducers of this type by providing a unitary brake-drum and drive-pulley on the in-put shaft for convenience in assembly and in mounting them at either side of the gear-case.

Another object of the invention is to provide a brake-operating device which can be conveniently mounted in different positions on the gear-case according to the points from which the brake is to be operated.

Another object of the invention is to provide an improved construction which permits the in-put shaft and the drive-pulley and brake-drum thereon to be reversed from one side of the gear-case to the other for operation from driving-belts at either side of the gear-case.

Other objects of the invention will appear from the detailed description.

The invention consists in the several novel features which are hereinafter set forth and more particularly described by claims at the conclusion hereof.

In the drawings: Fig. 1 is a plan of a speed-reducer embodying the invention. Fig. 2 is a side elevation. Fig. 3 is a section on line 3—3 of Fig. 4. Fig. 4 is a section on line 4—4 of Fig. 3.

The speed-reducer exemplifying the invention comprises a gear-case or box which consists of a body-section having a bottom-wall 10, end-walls 11, and side-walls 12, integrally formed of cast semi-steel and a longitudinally arched cover-section 13 removably secured by bolts 13ª to a flange around the upper ends of the end-walls 11 and side-walls 12. The body of the case is formed of one piece and the gearing contained therein is supported in the side-walls 12 without a split in the box to permit assembly of the gearing, as hereinafter described. The upper portion of the side-walls 12 are reinforced by an integral bridge 12ᵇ. The lower margin of the gear-case is provided with flanges 12ª having holes whereby the case may be secured by bolts to a common base for the gear-case and the engine or motor usually used to drive the gearing in the case. The gear-case is adapted to contain oil for lubricating the gearing. A filling-opening for oil is provided in one of the end-walls 11 and is closed by a screw-plug 14. A drain-plug 15 is provided in the same end-wall adjacent the bottom 10 to permit the oil to be drained from the gearing when an oil-change becomes necessary. The bottom-wall is sloped toward the plug 15 so all of the oil will drain through the drain-opening.

A power in-put shaft 17 extends across one end of the gear-case and is journaled in roller-bearings 18 which are carried in cylindrical openings 19 which extend through the side-walls 12 of the gear-case. A cap 20 is removably secured by bolts 21 to the outer side of one of the side-walls 12 of the gear-case to house and enclose the outer end of one of the bearings 18 and one end of shaft 17. The opposite end of shaft 17 extends through, and projects beyond, one side of the gear-case. A head 22 for housing the bearing 18 therein is removably secured by bolts to the outer face of the side-wall 12. The reduced end 17ª of shaft 17 extends through head 22. Head 22 is provided with packing 23 to prevent the escape of lubricant from bearing 18 and around shaft 17. A belt-pulley 24 is keyed to the outer projecting end 17ª of shaft 17 for driving said shaft. This pulley is usually driven by multiple V-belts from a motor or engine mounted longitudinally of and adjacent the drive-pulley 20 and on the base on which the gear-case is mounted. In practice, it is sometimes necessary to drive the speed-reducer from belts operating on different sides of the gear-case. Upon removal of head 22 and cap 20, shaft 17 and its bearings 18 can be withdrawn endwise from the gear-case and inserted from the other side so that when the cap 20 and head 22 are interchanged or reversed in the sides of the gear-case, the belt-pulley 24 will be operatively mounted at the opposite side of the gear-case from that shown, This exemplifies a transverse power in-put shaft which is removable from the case and endwise reversible therein so that the pulley 24 and shaft 17 may be driven from belting at either side of the gear-case.

A pinion 26 consists of teeth cut directly on the shaft 17, and a gear 27 meshing with pinion 26 drives an intermediate transverse shaft 28 for one speed reduction. A pinion 29 cut directly on shaft 28 meshes with a gear 30 on a transverse out-put shaft 31, and these provide a second speed reduction.

The ends of intermediate shaft 28 are journaled in roller-bearings 32, respectively. Each bearing 32 is mounted in a head 33 which fits in an opening formed in one of the side-walls 12 of the case and is provided with a flange which is removably secured by bolts to the outer face of said side-wall. Heads 33 removably support bearings 32 and close the cylindrical openings in walls 12 through which shaft 28 and pinion 29 are endwise insertable and removable. Upon removal of the heads 33 the shaft 28 may be reversed endwise to bring gear 26 into meshing relation with pinion 29 when the in-put shaft 17 is reversed endwise. The cylindrical openings in the side-walls 12 in which heads 33 fit, permit the endwise insertion of pinion 29 and shaft 28 into the gear-case from either side. A spline 27a slidably fits into a mating groove in the gear 27 to permit shaft 28 to be inserted into, and separated from, said gear, while said gear is in the gear-case.

The out-put shaft 31 is journaled in roller-bearings 35 which are mounted in heads 36. Heads 36 fit into and close openings 37 in the side-walls 12 of the gear-case and are provided with flanges which are removably secured to said walls by bolts 38. Caps 40 are secured to the outer ends of heads 36 and are provided with packing 41 for preventing the escape of lubricant from bearings 35 from the case. Shaft 31 is removable endwise from either side of the gear-case when caps 40 are removed. Preferably shaft 31 projects from both sides of the gear-case to operate cranks 43 at both sides of the case or a single crank at either side when the speed-reducer is used for oil-field work.

In the use of the gear-reducer for operating beams used for oil-field work, shaft 31 is used to drive cranks 43 and the load exerted upon shaft 31 and gear 30 is irregular or not constant during each revolution of cranks 43. In some instances, the load exerts more or less pounding moments upon said shaft, which is transmitted to the gearing in the case. In order to prevent these pounding or intermittent load-moments from being continuously exerted on the same group of teeth in one arcuate portion of gear 30 until such group becomes excessively worn, provision is made for rotatably adjusting the gear 30 relatively to the out-put shaft 31 so that, periodically, different groups of teeth or arcuate portions of gear 30 will receive the heavy load or pounding moments. For example, if the heavy load-stresses occur during part of the stroke of the crank 43, the gear-teeth of wheel 30, which engage pinion 29 during the down-stroke of the crank, will be subjected to the heavy load or pounding stresses and the remaining teeth will be subjected to lesser loads. By rotatably adjusting the shaft 31 in gear 30, the heavy load-stresses may be imposed on different groups of teeth on the gear 30 and, in this way, the life of the gear may be greatly prolonged by imposing the heavy loads upon different groups of said teeth. For this purpose, an adjustable spline-connection is provided between shaft 31 and the hub of gear 30. This connection comprises series of interfitting splines 45 formed on the central portion of shaft 31 and splines 46 in the bore of the hub of gear 30. Shaft 31 and gear 30 are confined against endwise movement in the gear-case by sleeves 47 which extend, respectively, between bearings 35 and the ends of the hub of gear 30 and the splines 45. Upon removal of one or both of the caps 40 from the gear-case, shaft 31 can be removed endwise from the casing sufficiently to disengage splines 45 on shaft 31 from the splines 46 on wheel 30. When these splines have been disengaged, the shaft can be given a partial rotation in wheel 30, so that different groups of gear-teeth in said wheel, will be subjected to the heavy loads. After such adjustment the shaft 31 can be reinserted into the hub of gear 30 and cap 40 replaced to hold the shaft in its operative position and against endwise movement. The sleeves 45 serve as simple means for positioning and retaining gear 30 and shaft 31 in operative position.

Gear 30 is also reversible in the gear-case when shaft 31 has been withdrawn from the casing and from the hub of said gear so that the teeth of the latter will be positioned to mesh with the pinion 29 in its reversed position, and shafts 28 and 17 are reversed to position the drive-pulley 24 at the opposite side of the case from that shown in Fig. 3. Sleeves 47 position the gear 30 in either of its positions in the gear-case.

In speed-reducers of this type, it is necessary to apply a brake to hold the beam operated by the cranks on shaft 31 when desired. A brake-drum 48 is integrally formed with, and projects inwardly from, the belt-pulley 24. Forming the brake-drum integral with the belt-wheel provides a simple construction which can be reversed together from one side of the case to the other. A brake-operating lever 49 is fulcrumed on a pin 50 and has connected thereto a band 51 which is adapted to frictionally engage drum 48 to brake the gearing. Lever 49 is operable by any suitable connection, such as a cable or link 53, which is connected to the free end of lever 49. The fulcrum-pin 50 is removably secured in any of the pivot-lugs 52 which are integrally formed with the gear-case. A lug 52 is provided adjacent the bottom and another at the top of the case and similar lugs are provided at both sides of the gear-case. This makes it possible to fulcrum the brake-lever to swing from its upper or lower end and also to position it at either side of the gear-case according to the side at which the brake-drum and belt-pulley are mounted. The fulcrum-pin 50 can be secured in any of the lugs 52 by a set-screw 54.

In operation, the pulley 24 will be driven from a source of power to drive in-put shaft 17 and pinion 26. Said pinion will drive gear 27, shaft 28 and pinion 29. One speed reduction will be effected between pinion 26 and gear 27. Pinion 29 will drive gear 30 for another speed-reduction, to drive shaft 31 through the spline-connections 45, 46 between said shaft and said gearing. Whenever it is necessary to position the belt-pulley 24 at the opposite side of the gear-case, cap 20 and head 22 will be disconnected from the gear-case, which will permit shaft 17, pinion 26, and bearings 18 to be withdrawn endwise from one side of the gear-case and then inserted into the opposite side. Upon replacement of cap 20 and head 22 the shaft 17, drive-pulley 24 and brake-drum 48 will be operatively mounted at the opposite side of the gear-case. Intermediate shaft 28 and pinion 29, upon removal of caps 33, can be removed endwise through the sides of the case and withdrawn from gear 27 and then gear 27 will be moved to the opposite side of the case where it will be in position to mesh with pinion 26. Upon replacement of caps 33, shaft 28 will be reversely positioned in the case so that gear 27 will mesh with pinion 26. Upon removal of the heads 36, shaft 31 can be withdrawn endwise from the case with one of the bearings 35 and from the other bearing 35. Upon such removal, one of the sleeves 47 will be released so that it can be withdrawn from one end of shaft 31 and the splines 45 will be withdrawn endwise from the splines 46 in the hub of the gear 30. Gear 30, to which access can be had, by removal of the cover-plate 13, can then be reversed to bring its gear-teeth into longitudinal alignment for engagement with pinion 29. Shaft 31 is then replaced in the gear-case and bearings 35, the sleeves 47 serving to engage the splines 45, 46 to hold gear 30 in its reversed position and against endwise movement. After the speed-reducer has been operated for a period, and particularly when the load-stresses are uneven during each revolution of the shaft 31, the cap 40 and head 36 at one side of the gear-casing will be removed and the shaft 31 will be moved through the open side of the case a sufficient distance to disengage the splines 45 on said shaft from the splines 46 in the hub of gear 30. The shaft will then be given a partial rotation and then replaced in gear 30 to bring the splines 46 and 45 into inter-fitting relation. The head 36 and cap 40, which have been removed from the case, will then be replaced on the case. The relationship between shaft 31 and gear 30 will then be such that the gear-teeth of gear 30, which mesh with pinions 29 during the application of heavy loads to shaft 31, will be positioned where they will receive the lighter loads and those formerly receiving the light loads will then receive the heavy or pounding loads. The variable spline-connection between shaft 31 and the hub of gear 30 permits this to be done so that the wear upon the teeth of the gear 30 will be distributed so that there will be a uniform, as contradistinguished from localized, wear. In reducers of this type, localized wear on the gears increases the effect of the pounding upon the gear-teeth and, by this adjustment, the life of the gears will be greatly prolonged. When the pulley 24 is reversed from one side of the gear-case to the other, the brake-lever 49, its fulcrum 50, and the brake-band 51 may be conjointly disconnected from the lug 56 at one side and connected to a lug at the other side. In practice, it is sometimes necessary to locate the operating connection 52 for the brake-lever 49 at the top or the bottom of the gear-case. When the connection must be located at the top of the gear-case, the lever 49 will be fulcrumed into one of the lower lugs 52. When the connection 52 must be located adjacent the bottom of the gear-case, the lever will be fulcrumed in one of the upper lugs 52, as illustrated by dotted lines in Fig. 4. The provision of pivot-lugs at the top and bottom of the case and at the opposite sides thereof, makes it possible to mount the lever 49 to meet the requirements of use in different places and according to the location of the motor or engine with respect to the other requirements in practice. During the operation of the speed-reducer, gears 27 and 30 will pass through the bath of oil in the gear-case and lubricate the pinions and the bearings.

The invention exemplifies a speed-reducing unit which is particularly adapted to meet the varying requirements for oil-field use, although it will be understood that it is also usable in other industrial work.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In driving mechanism, the combination of a gear-case provided with integral sides and ends and a bottom and a removable top, a bridge-bar integral with, extending between, the side-walls adjacent their upper portions and spaced from the ends, a power in-put shaft, an out-put shaft, an intermediate shaft, all of said shafts extending transversely across the case, said bar being disposed substantially above the intermediate shaft, removable means for rotatably supporting the shafts for endwise insertion in, and removal from, the case, speed-reducing gears between the in-put shaft and the intermediate shaft, and speed-reducing gears between the intermediate shaft and the out-put shaft.

2. In driving mechanism, the combination of a gear-case comprising a body having integral side, end and bottom-walls, speed-reducing gearing in the case comprising an output shaft extending transversely through the case and projecting outwardly from one side thereof and provided with means for the attachment of a driving crank, a spur gear around the shaft and in the case, the sides of the case being provided with openings entirely surrounded by integral portions of the side-walls, bearings for the output shaft removably supported in said openings by said side-walls, a continuous series of interchangeably interfitting splines on the output shaft and gear thereon, respectively, extending entirely through the hub of the gear, the splines on the shaft projecting outwardly of its periphery and being endwise insertable and removable from either side of the gear to permit the output shaft and the gear thereon to be connected for driving engagement in a series of different relatively rotative positions for changing the phase relation of the crank on the shaft and the teeth on the gear, means for holding the gear against endwise movement on the shaft, the shaft and said means being endwise separable from the gear when one of the bearings is removed from the case.

3. In driving mechanism, the combination of a gear-case comprising a body having integral side, end and bottom-walls, speed-reducing gearing in the case comprising an output shaft extending transversely through the case and projecting outwardly from one side thereof and provided with means for the attachment of a driving crank, a spur gear around the shaft and in the case, the sides of the case being provided with openings entirely surrounded by integral portions of the side-walls, bearings for the output shaft removably supported in said openings and entirely by said side-walls, a continuous series of interchangeably interfitting splines on the output shaft and gear thereon, respectively, extending entirely across the hub of the gear, the splines on the shaft projecting outwardly of its periphery and being endwise insertable and removable from either side of the gear to permit the output shaft and the gear thereon to be connected for driving engagement in a series of different relatively rotative positions for varying the phase relation of the crank and teeth on the gear, sleeves extending between the splines on the shaft and the bearings for holding the gear against endwise movement in the case, the shaft and sleeves being endwise separable from the gear when the bearings are removd from the case.

4. In driving mechanism, the combination of a gear-case comprising a body having integral side, end and bottom-walls and a removable top-wall, a power input shaft, an output shaft, an intermediate shaft extending transversely through the case and projecting outwardly from one side thereof and provided with means for the attachment of a driving crank, the sides of the case being provided with openings entirely surrounded by integral portions of the side-walls, bearings removably supported in said openings and entirely by said side-walls for rotatably supporting all of said shafts in the case, all of the shafts extending transversely across the case on parallel axes and between the sides thereof, a pinion integral with the input shaft, a pinion integral with the intermediate shaft, a gear splined to the intermediate shaft for endwise separation and engaging the pinion on the input shaft, a gear on the output shaft meshing with the pinion on the intermediate shaft, and a continuous series of interchangeably interfitting splines between and for endwise separation of the output shaft and the gear thereon for varying the phase relation of the crank and the teeth of the gear on the output shaft, the openings in the side-walls of the case for the bearings of the input and intermediate shafts being of sufficient diameter for the endwise removal and insertion through either side of the case of the input and itnermediate shafts when the bearings are removed, the openings for the bearings for the output shaft being of sufficient diameter for the endwise removal of the output shaft.

BRADFORD FOOTE.